(12) United States Patent
Yang

(10) Patent No.: US 11,056,743 B2
(45) Date of Patent: Jul. 6, 2021

(54) ELECTRICITY SUPPLY SYSTEM AND PACKAGE STRUCTURE THEREOF

(71) Applicants: PROLOGIUM TECHNOLOGY CO., LTD., Taoyuan (TW); PROLOGIUM HOLDING INC., Grand Cayman (KY)

(72) Inventor: Szu-Nan Yang, Taiepei (TW)

(73) Assignees: PROLOGIUM TECHNOLOGY CO., LTD., Taoyuan (TW); PROLOGIUM HOLDING INC., Grand Cayman (KY)

(*) Notice: Subject to any disclaimer, the term of this patent is extended or adjusted under 35 U.S.C. 154(b) by 229 days.

(21) Appl. No.: 16/530,513

(22) Filed: Aug. 2, 2019

(65) Prior Publication Data

US 2019/0355942 A1 Nov. 21, 2019

Related U.S. Application Data

(63) Continuation-in-part of application No. 15/806,940, filed on Nov. 8, 2017, now abandoned, which is a continuation-in-part of application No. 12/915,721, filed on Oct. 19, 2010, now abandoned, application No. 16/530,513, which is a continuation-in-part of application No. 15/141,826, filed on Apr. 29, 2016, now Pat. No. 10,826,030, which is a continuation-in-part of application No. 13/714,373, filed on Dec. 13, 2012, now abandoned.

(51) Int. Cl.
| | |
|---|---|
| *H01M 50/171* | (2021.01) |
| *H01M 50/124* | (2021.01) |
| *H01M 50/116* | (2021.01) |
| *H01M 50/166* | (2021.01) |

(52) U.S. Cl.
CPC ....... *H01M 50/171* (2021.01); *H01M 50/116* (2021.01); *H01M 50/124* (2021.01); *H01M 50/1243* (2021.01); *H01M 50/166* (2021.01)

(58) Field of Classification Search
None
See application file for complete search history.

(56) References Cited

U.S. PATENT DOCUMENTS

| | | | |
|---|---|---|---|
| 5,239,034 | A | 8/1993 | Takago et al. |
| 5,637,418 | A | 6/1997 | Brown et al. |
| 2002/0182492 | A1 | 12/2002 | Kimura et al. |
| 2003/0059673 | A1 | 3/2003 | Langan et al. |
| 2006/0216586 | A1 | 9/2006 | Tucholski |

FOREIGN PATENT DOCUMENTS

| | | |
|---|---|---|
| JP | H09-283387 A | 10/1997 |
| JP | 2001-040094 A | 2/2001 |
| JP | 2009-245782 A | 10/2009 |
| JP | 2009-289549 A | 12/2009 |

*Primary Examiner* — Ula C Ruddock
*Assistant Examiner* — Tony S Chuo
(74) *Attorney, Agent, or Firm* — Rabin & Berdo, P.C.

(57) ABSTRACT

A package structure and its related electricity supply system are disclosed. Two substrates of the package structure are directly or indirectly served as current collectors of the electricity supply system. The sealing frame of the package structure is made of several silicone layers having high moisture-resistance and/or high gas-resistance. Hence, the package structure mentioned may not only provide a novel electrical conduction module to lower the intrinsic impedance of the electricity supply system itself but prevent the moisture and the gas outward from the electricity supply unit inside the package structure as well. Consequently, the electrical performance and safety of the electricity supply system are both improved.

15 Claims, 14 Drawing Sheets

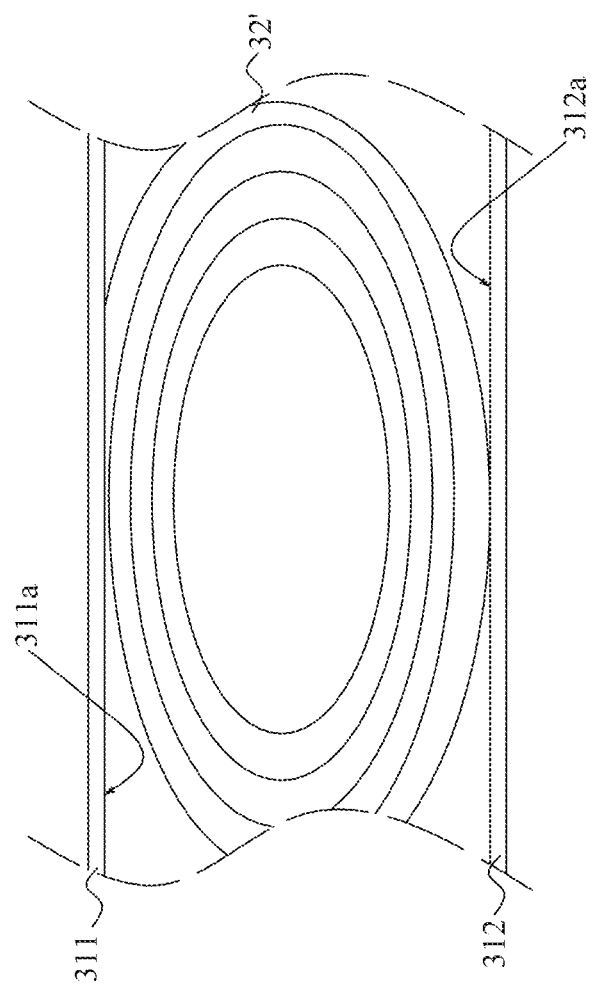

ELECTRICITY SUPPLY SYSTEM AND PACKAGE STRUCTURE THEREOF

CROSS-REFERENCE TO RELATED APPLICATION

This application is a continuation-in-part (CIP) of U.S. patent application Ser. No. 15/806,940, filed on Nov. 8, 2017, and U.S. patent application Ser. No. 15/141,826, filed on Apr. 29, 2016. The prior applications are herewith incorporated by reference in its entirety.

BACKGROUND OF THE INVENTION

Field of Invention

The present invention relates to a package structure and its related electricity supply system and especially is related to a package structure and its related electricity supply system having a brand new electrical conduction module and excellent abilities of moisture resistance and gas resistance.

Related Art

In the electronic device industry, portability and wireless design are the major trends. Except the lighter, thinner and smaller designs, the flexibility of the electronics is highly focused as well. Hence, an electricity supply system having smaller volume, lighter weight and higher energy density is imperatively required. However, to prolong the life and to increase the energy density of the electricity supply system, the primary electricity supply system obviously can not satisfy the demands of the current electronics. And this is the reason why the secondary electricity supply systems such as the lithium battery system, fuel cell system, solar cell system become the main stream for their recharge abilities. The lithium battery system is taken as the example for its highly development.

FIG. 1 illustrates the current cell of the lithium battery system. The main structure is constructed by a separator layer sandwiched by a cathode electrode and an anode electrode. The external electrodes of the whole lithium battery system, which are electrically connected to the peripherals, are welded individually to the tabs located in the current collectors of both cathode and anode electrodes. As shown in FIG. 1, the lithium battery 1 includes a separator layer 11, a first active material layer 12, a second active material layer 13, a first current collector layer 14, a second current collector layer 15 and a package unit 16. The first active material layer 12 is located above the separator layer 11. The first current collector layer 14 is located above the first active material layer 12. The second active material layer 13 is located under the separator layer 11. The second current collector layer 15 is located under the second active material layer 13. The package unit 16 seals the whole stacking structure mentioned above except the two tabs 141 and 151. Accordingly, as the lithium battery 1 provides the electricity to an electronic device 2 (the circuit broad illustrated in FIG. 1 is only one embodiment and is not a limitation for the electronic device 2), the tabs 141 and 151 are electrically connected to the electricity input terminals 21 and 22 of the electronic device 2 so that the electricity stored in the lithium battery 1 is transferred to the electronic device 2. After that, the electricity is transferred to the element area 23 of the electronic device 2 by the layouts. The element area 23 mentioned here may be the circuit layouts or the surface mounted elements, that is, typically includes the logical circuit, active elements, and passive elements and so on. However, the electrical and safety performances of the lithium battery 1 are dramatically influenced by the characteristics of both the interface between the separator layer 11 and the first active material layer 12 and the interface between the separator layer 11 and the second active material layer 13. For the current lithium battery system, the characteristics of these interfaces are controlled either by solid stacking method or by high-tension winding method to ensure the good electrical and safety performances of the lithium battery system. Unfortunately, the lithium battery systems made by solid stacking or high-tension winding method are definitely lack of flexibility and even are impossible to be flexed. If the stacked battery or the winded battery is forced to be flexed would cause the serious damage to the interfaces between the separator layer 11 and the first active material layer 12 and the separator layer 11 and the second active material layer 13.

As for the current package unit of the current electricity supply system, no matter for the primary battery system or for the secondary battery system, most of the packages of the battery system are with the hard metal cases including the cylindrical cases and prismatic cases. For example, most of the battery systems exerted in the current notebooks are the lithium battery in shape of 18650 cylinders with hard metal cases; most of the battery systems exerted in the current portable communication devices are the lithium battery in the shape of 383562 prisms with hard metal cases. The advantages of the hard metal case are to prevent the cell from the external force and also to reduce the influence of the environmental factors such as the moisture and oxygen and so on. Hence, for the terminal electronics, the secondary battery systems are indeed able to provide better electrical performance and better safety performance but the fixed size and the hard case become the serious limitations for matching with most of the electronics. Although a soft-pack lithium battery system had been developed for reducing the difficulties of exerting in the current electronics, the soft-pack lithium battery system, comparing to the lithium battery systems having the hard metal packages, has to be sealed by a hot pressing procedure so that the interface between the metal tab and soft package would be poor because the material of the tab is metal while the material of the soft package is thermal-sealing polymer. Naturally, the abilities of gas resistance, especially for oxygen, and of moisture resistance of the soft package would be worse than the hard metal case with welding sealing. Furthermore, after several times of charging and discharging, the dimensions of the whole battery system have to suffer expansion and shrinkage alternatively. Due to the weaker stress of the material of the soft package, the secondary battery having the soft package is not able to maintain its own dimension and this disadvantage would be the killing problem for circuit design of the electronics.

As illustrated in FIG. 1, the separator layer 11 between the first active material layer 12 and the second active material layer 13 is mainly used for preventing the direct connection between the first electrode substrate (including the first active material layer 11 and the first current collector layer 14) and the second electrode substrate (including the second active material layer 13 and the second current collector layer 15). Once the first electrode substrate connects to the second electrode substrate directly, the lithium battery 1 would have the inner shortage problem. However, since the ion migrations inside the lithium battery 1 are still needed, the material of the separator layer 11 must be electrically insulated as well as porous so that the most popular materials of the separator layer 11 are PVC, PC and any other polymers. Besides, according to the glass transition temperature and softening temperature of the different polymers or one polymer with different molecular weights, the partial structure of the polymer may be changed within a certain range of the temperature. Hence, when the inner temperature of the battery system is increased due to the inner shortage or the external shortage or any other reasons, the structure of the separator layer 11 would be changed to block the paths of ion migrations inside the lithium battery 1 for avoiding the reactions under the high temperature and further reducing the possibility of explosion of the lithium battery 1. If the inner temperature of the lithium battery 1 still increases under certain reasons, the structure of the separator layer 11 would be totally melted till the inner temperature reaches to 150° C. to 180° C. In this case, the melted separator layer 11 would not be able to provide any protections between the first electrode substrate and the second electrode substrate so that the lithium battery 1 would be entirely short and even gets on fire or explodes. Apparently, the current separator layer 11 is a great threat to the safety of the lithium battery 1.

Besides the disadvantages mentioned above, the most important is almost all the circuits and elements are designed as flexible for matching with the flexible devices except for the battery system. Till now, the flexibility of the battery system can not coexist with the good electrical and safety performances. Meanwhile, the dimensions of the battery system are not easy to meet the requirements of smaller and thinner so that most of the electronics have to reserve a space for the battery system and this would make the dimensions of the electronics become much more difficult to be reduced.

SUMMARY OF THE INVENTION

It is an objective of this invention to provide a package structure and its related electricity supply system. The package mentioned in this invention acts as a sealing frame to block the moisture and gas from outsides so that the chemical and the electrical reactions of the electricity supply unit would not be affected.

Another objective of this invention is to provide a package structure and its related electricity supply system. The sealing frame may be rapidly and precisely formed on the first substrate and the second substrate by screen printing or coating. The package structure mentioned in this invention may be produced under higher yield rate and faster production rate.

It is an objective of this invention to provide a package structure and its related electricity supply system. The electricity supply system is able to directly electrically connected to the external electrical elements so that the amounts of the elements exerted in the electronic may be reduced and the dimensions of the electronics are able to become smaller and thinner as well.

It is an objective of this invention to provide a package structure and its related electricity supply system. The package structure can be integrated with the electricity supply unit so that the materials used are reduced and the production cost of the electronics can be reduced as well.

It is an objective of this invention to provide a package structure and its related electricity supply system. Once the electricity supply system is impacted by the external forces, the electricity supply unit would be immediately separated from the package structure to form a protective open circuit so that the safety performance of the electricity supply system is increased.

Another objective of this invention is to provide a package structure and its related electricity supply system. The package structure may be integrated with the electricity supply unit so that the amounts of the total interfaces inside the electricity supply system are reduced to reduce the inner resistance of the electricity supply system and to increase the electrical performance of the electricity supply system as well.

In order to implement the abovementioned, this invention discloses a package structure and its related electricity supply system. A flexible sealing frame is exerted to seal a space between the first substrate and the second substrate so that the electricity supply unit placed inside the space can be totally isolated from the external moisture and gas to ensure the electrical and safety performances of the electricity supply system. At least one of the first substrate and the second substrate can be a circuit broad and electrically connects to the peripheral electronics so that the amounts of the elements exerted inside the electronics may be reduced to implement the designs of smaller and thinner.

The first electrode includes a first active material layer and a first current collector. The first current collector is directly contacted to the first active material layer and has a first sealing region. The second electrode includes a second active material layer and a second current collector. The second current collector is directly contacted to the second active material layer and has a second sealing region. The flexible sealing frame is disposed between the first sealing region of the first current collector and the second sealing region of the second current collector. The flexible sealing frame is used for adhering the first current collector to the second current collector to provide an enclosed space to accumulate the first active material, the second active material and the separator layer.

The flexible sealing frame includes two first silicone layers and a second silicone layer. The first silicone layers mainly contain a chemical formula I of:

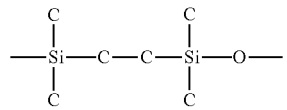

The second silicone layer mainly contains a chemical formula II of:

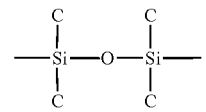

Both the first silicone layers and the second silicone layer contain the chemical formula I and the chemical formula II. This solves the problems of bubbles or the substrate easily peeling off. The interfacial tension and the polarity of silicone are modified of the modified silicone cured layer to enhance the adhesion for different materials. Moreover, the sealing frame is flexible after sealing and can totally match with the flexible electricity supply unit placed inside. And of course, the package structure can meet the requirement of the flexible electronics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 5B illustrates the cross-section configuration of the electricity supply system having the winding type electrode placed inside the package structure of the present invention.

DETAILED DESCRIPTION OF THE INVENTION

Figure 1:
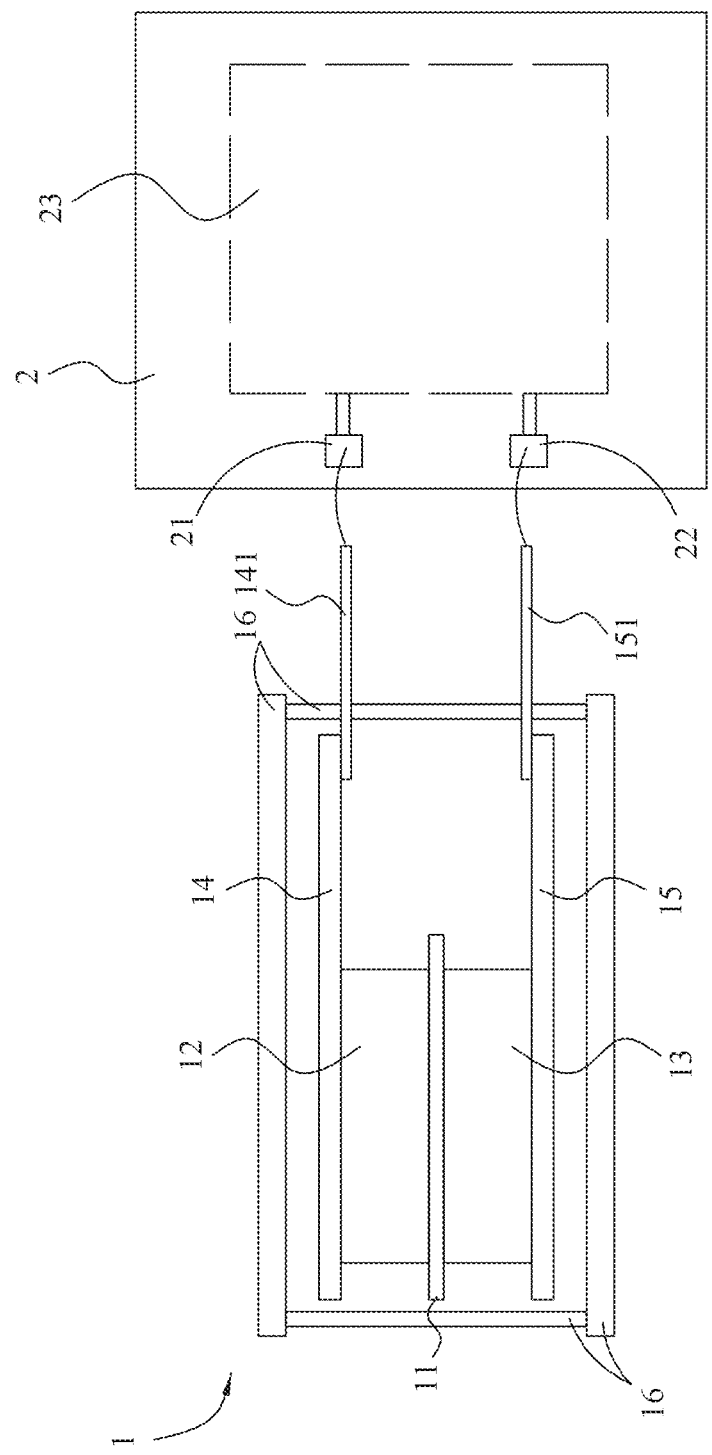
FIG. 1 illustrates the example of the cell of the prior-art lithium battery system.
Figure 2A:
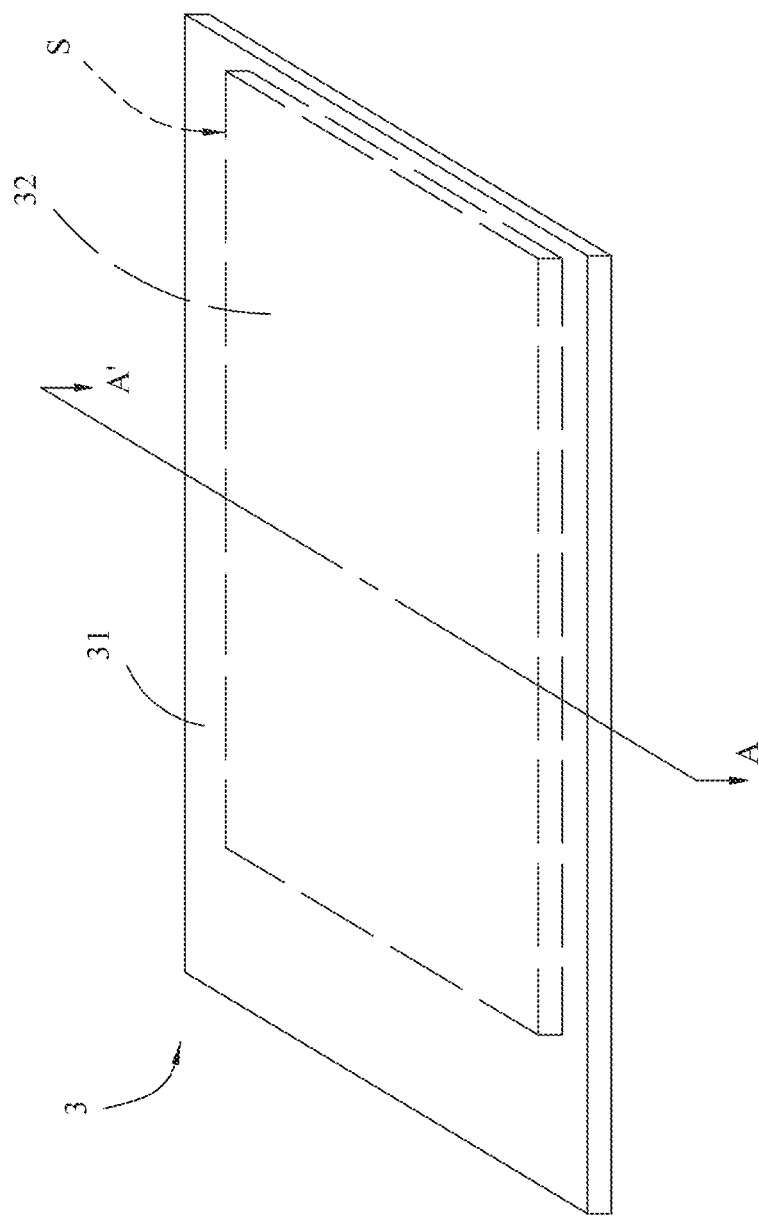
FIG. 2A illustrates the package structure of the electricity supply system of the present invention.
Figure 2B:
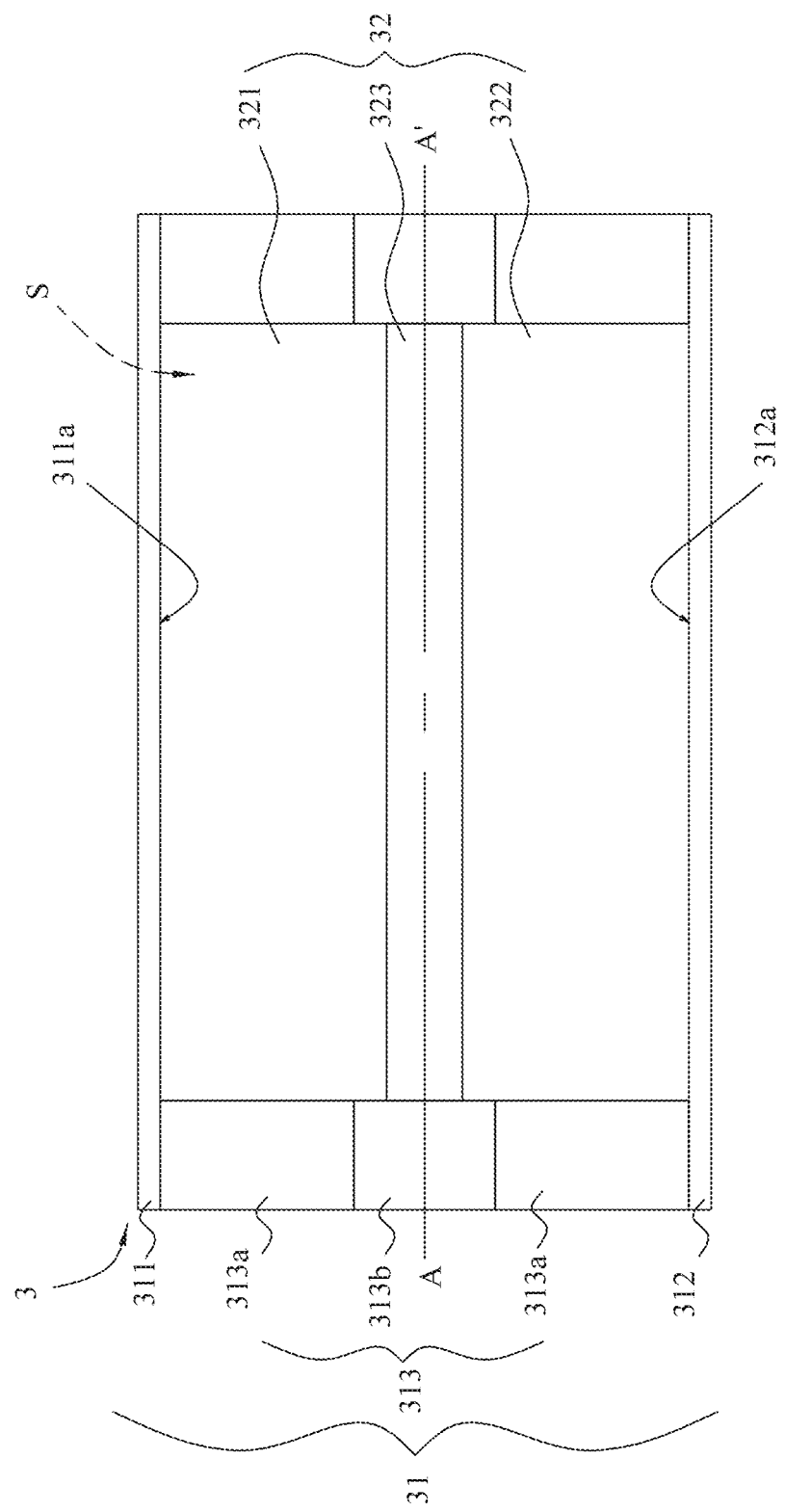
FIG. 2B illustrates the cross-section view configuration along the A-A' line in FIG. 2A.

FIG. 2A illustrates the appearance of the package structure of the electricity supply system of this invention and FIG. 2B illustrates the cross-section view along the A-A' line of the FIG. 2A. The package structure 31 of this invention is used for placing an electricity supply unit 32. The package structure 31 includes a first substrate 311, a second substrate 312 and a sealing frame 313. The package structure 31 can be directly exposed in the general environment and has the ability to resist external forces and moisture penetration. The first substrate 311 has at least one first conductive surface 311a and the second substrate 312 has at least one second conductive surface 312a. The sealing frame 313 surrounds the edges between the first substrate 311 and the second substrate 312 so that there is a space S formed among the sealing frame 313, the first substrate 311 and the second substrate 312. The space S is used for placing the electricity supply unit 32.

The electricity supply unit 32 is electrically connected to the first conductive surface 311a of the first substrate 311 as well as connected to the second conductive surface 312a of the second substrate 312. The sealing frame 313 includes two first silicone layers 313a and a second silicone layer 313b. Two first silicone layers 313a adhere to the first substrate 311 and the second substrate 312 respectively. That is, the first substrate 311 and the second substrate 312 adhere to one of first silicone layers 313a respectively. The second silicone layer 313b is located between the two first silicone layers 313a to stick the two first silicone layers 313a, that is, the first silicone layer 313a attached to the first substrate 311 and the first silicone layer 313a attached to the second substrate 312 are adhered to each other by the second silicone layer 313b.

Figure 9A:
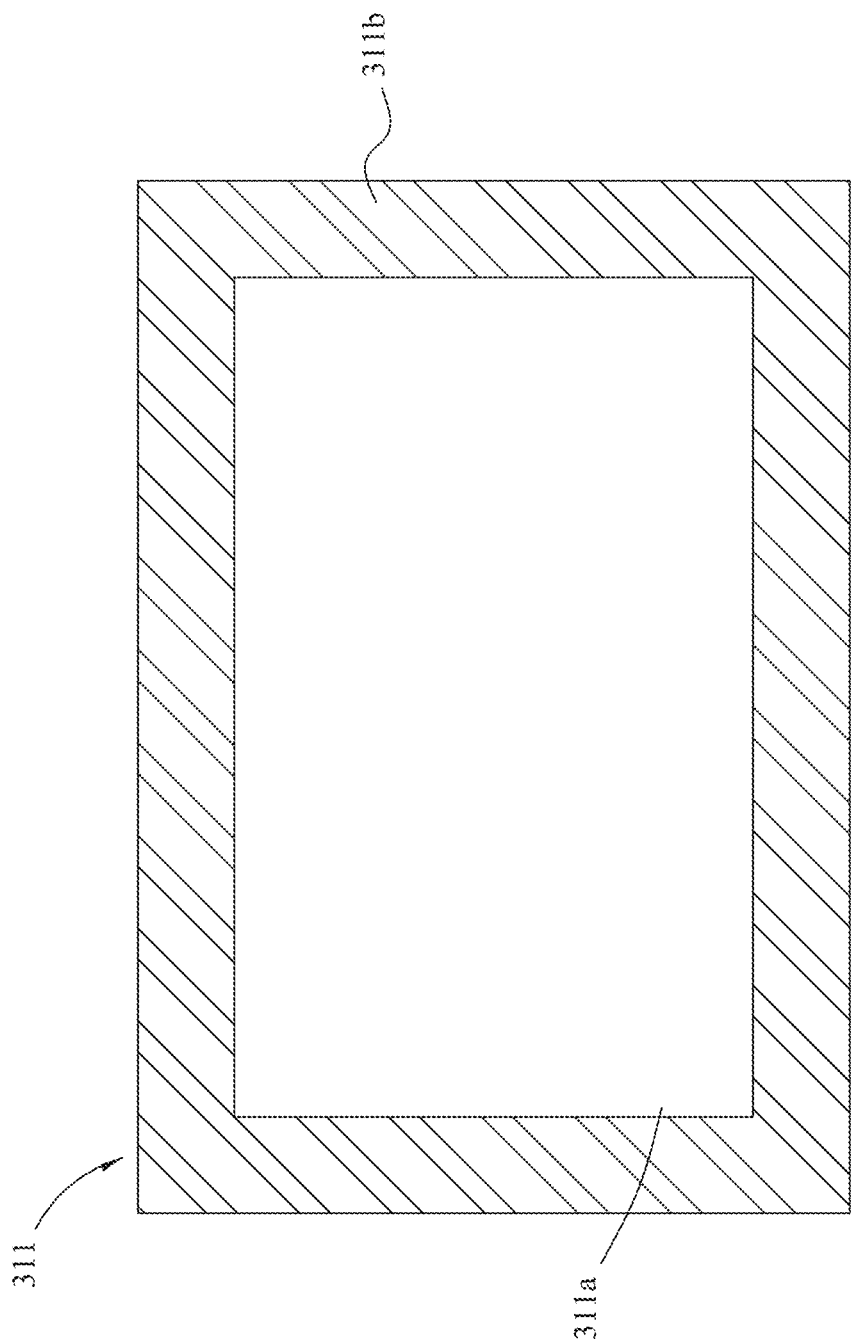
FIG. 9A illustrates the first conductive surface of the first substrate of the present invention, showing an embodiment of the first sealing region.
Figure 9B:
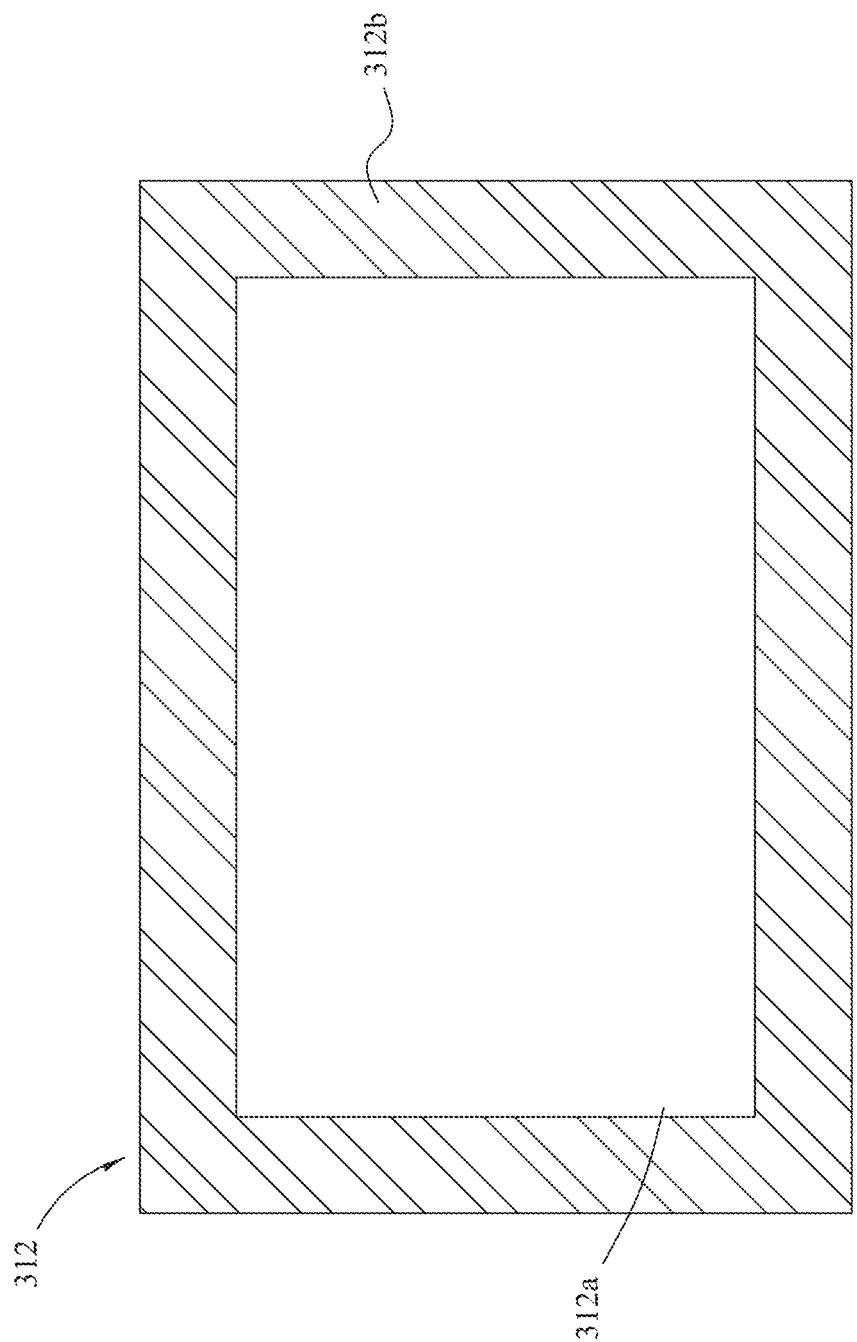
FIG. 9B illustrates the second conductive surface of the second substrate of the present invention, showing an embodiment of the second sealing region.

Furthermore, please refer to FIG. 9A, the first conductive surface 311a of the first substrate 311 has a first sealing region 311b, which is defined along the circumference of the first conductive surface 311a. The remaining area of the first conductive surface 311a of the first substrate 311, surrounded by the first sealing region 311b, is primarily to provide as the contact area for the first active material layer. One of the first silicone layer 313a is adhered to the first sealing region 311b. please refer to FIG. 9B, the second conductive surface 312a of the second substrate 312 has a second sealing region 312b, which is defined along the circumference of the second conductive surface 312a. The other first silicone layer 313a is adhered to the second sealing region 312b. The remaining area of the second conductive surface 312a of the second substrate 312, surrounded by the second sealing region 312b, is primarily to provide as the contact area for the second active material layer.

To make the first silicone layers 313a and the second silicone layer 313b with different adhesion property, different additives or formulas are used to modify the adhesion property of the first silicone layers 313a and the second silicone layer 313b. The interfacial tension and the polarity of silicone of the first silicone layer 313a are modified, depending on the materials of the first conductive surface 311a and the second conductive surface 312a, to enhance the adhesion for different materials. The adhesion force of the first adhesion 313a between surfaces with different materials, such as metal substrates and silicone, i.e. the second silicone layer 313b, is improved. Therefore, the first silicone layer 313a are adhered firmly between the first substrate 311 and the second substrate 312. On the other hand, the second silicone layer 131b is used to adhere two first silicone layers 313a. Therefore, the adhesion force of the second adhesion 313b between surfaces with the same materials or property, is improved. Thus, the first substrate 311 and the second substrate 312 are adhered firmly by the first silicone layers 313a and the second silicone layer 313b. And the space S, formed among the sealing frame 313, the first substrate 311 and the second substrate 312, would be totally isolated from the external moisture and gas to ensure the electrical and safety performances of the electricity supply system.

The first silicone layers 313a mainly contain a chemical formula I of:

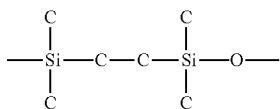

The second silicone layer 313b mainly contains a chemical formula II of:

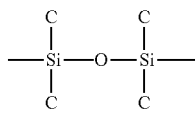

Both the first silicone layers 313a and the second silicone layer 313b contain both the chemical formula I and the chemical formula II.

Amounts of the chemical formula I within each of the first silicone layers 313a is greater than amounts of the chemical formula II within each of the first silicone layers 313a. Amounts of the chemical formula II within the second silicone layer 313b is greater than amounts of the chemical formula I within the second silicone layer 313b.

Also, amounts of the chemical formula II within the second silicone layer 313b is greater than amounts of the chemical formula II within the first silicone layers 313a by 0.1% to 60%, on a weight/volume basis. The first silicone layers 313a are modified by increasing a proportion of addition-type silicone and/or by adding epoxy, acrylic acid or a combination thereof into silicone.

As an example of the forming method, the first silicone layers 313a are formed on the first conductive surface 311a of the first substrate 311, and the second conductive surface 312a of the second substrate 312 respectively, by the screen printing method or the coating method, for example. Then, surface characteristics of the first conductive surface 311a and the second conductive surface 312a are modified to enhance bonding ability with the second silicone layers 313b in the subsequent process. In the other words, the first silicone layers 313a can be considered as the surface-modified layer of the first substrate 311 and the second substrate 312 respectively. Furthermore, the first silicone layers 313a are adhered along their inner circumferences of the first conductive surface 311a and the second conductive surface 312a.

Then the polymerization is performed slowly for curing. Since one side of the first silicone layers 313a is free and the slowly curing process is performed, the produced gas can be exhausted. Also, the first silicone layers 313a are modified depending on the materials of the first conductive surface 311a of the first substrate 311, and the second conductive surface 312a of the second substrate 312 respectively. The good adhesion situations are presented on the interfaces between the first silicone layers 313a and the first substrate 311, and the first silicone layers 313a and the second substrate 312.

The second silicone layers 313b is disposed on one of the first silicone layers 313a. Then, the first substrate 311 and the second substrate 312, together with the second silicone layers 313b and the first silicone layer 313a, are combined. This polymerization is performed in two stages to bond together firmly. In addition, a pressing step can be combined with the polymerization process. The heat treatment temperature of first stage is lower than the heat treatment temperature of second stage. The heat treatment duration of first stage is longer than the heat treatment duration of second stage. During the lower temperature of the first stage, the chemical formula II of the second silicone layers 313b is the dominant component to form a crystalline structure in the second silicone layers 313b. Due to the thickness of the second silicone layers 313b is thin, the crystalline structure is essentially regarded as the main moisture-blocking structure of the second silicone layers 313b. The crystalline structure can enhance the moisture-blocking ability of the interfaces between the second silicone layers 313b and any one of the first silicone layer 313a. It is very important capability for package structure of the electricity supply system, such as the lithium battery.

During the higher temperature of the second stage, the chemical formula I of the second silicone layers 313b is the dominant component and has better bonding ability than the chemical formula II. Therefore, the second silicone layers 313b and the first silicone layers 313a are bonded together firmly. Preferably, the heat treatment temperature of first stage is lower than the heat treatment temperature of second stage by 30 to 70 degrees C. °.

The heat treatment duration of first stage is longer than the heat treatment duration of second stage by 80 to 300 seconds. To prevent the second silicone layers 313b to be deformed during above-mentioned process, the second silicone layers 313b further includes a spacer. The spacer includes silicon dioxide particles, titanium oxide particles or a combination thereof.

Since the second silicone layers 313b is disposed between the first silicone layers 313a, which are made of the same or substantially the same material, i.e. silicone, the adhesion force therebetween is high. Even though gas is produced, the adhesion structure is not easily weakened. Also, silicone is not as dense as the first substrate 311 and the second substrate 312. In micro-view, the silicone has larger hole inside than the materials of the first substrate 311 and the second substrate 312. Even though the second silicone layers 313b is disposed between the first silicone layers 313a for curing, the produced gas is easily exhausted from the first silicone layers 313a, and does not readily collect to form bubbles. The intermolecular forces between the second silicone layers 313b and the first silicone layers 313a are equal. The gas flows inside are uniform. The gas bubbles will not easily merge to form larger ones. Therefore, the good adhesion situations are presented on the interfaces between the first silicone layers 313a and the second silicone layers 313b. The interfaces between the first silicone layers 313a and the first substrate 311, and the first silicone layers 313a and the second substrate 312 are secured better interface adhesion than the conventional interfaces.

Figure 3:
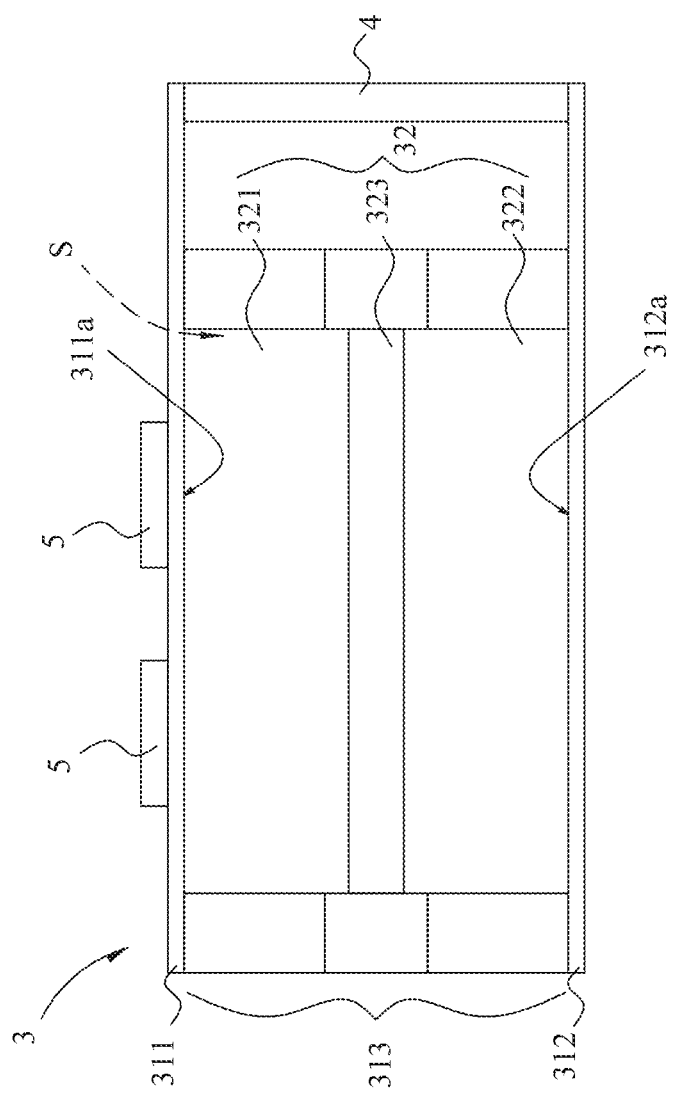
FIG. 3 illustrates an embodiment that the first substrate of the package structure serves as a circuit broad of the present invention.

At least one of the first substrate 311 and the second substrate 312 is a circuit broad, such as the printed circuit broad, multi-layer circuit broad and flexible printed circuit broad and so on, or a metal layer. No matter for the first substrate 311 or the second substrate 312, at least one of the first substrate 311 and the second substrate 312 must have a conductive surface (the first conductive surface 311a and/or the second conductive surface 312a) to electrically connects to the electricity supply unit 32 placed inside the package structure 31 so that the electrical power generated by the electricity supply unit 32 is collected by the conductive surface (the first conductive surface 311a and/or the second conductive surface 312a) and furthermore, the electrical power collected may be transferred to the circuit broad according to the different mechanical designs. For example, FIG. 3 illustrates one of the possible embodiments, as for the substrate (the first substrate 311 as the example here) acting as the circuit broad and having one conductive surface (the first conductive surface 311a as the example here), the electrical power collected can be directly transferred to the circuit broad (the first substrate 311) by the conductive surface (the first conductive surface 311a). As for the substrate (the second substrate 312 as the example here) only having one conductive surface (the second conductive surface 312a as the example here), the electrical power collected is transferred by the electrical connection between the two substrates (the first substrate 311 and the second substrate 312). At last, a complete loop is formed within the electricity supply unit 32 and the electrical power may be transferred to the element 5 laid on the circuit broad (the first substrate 311). If both the first substrate 311 and the second substrate 312 are circuit broads, the electrical connection between the first substrate 311 and the second substrate 312 not only being used for providing electrical power but acting as the electrical path for elements laid on the first substrate 311 and the second substrate 312 as well. However, besides acting as the circuit broads, the first substrate 311 and the second substrate 312 can also act as the metal substrates, the glass substrates, the composite substrates such as the metal-polymer composite substrates and so on.

Figure 8:
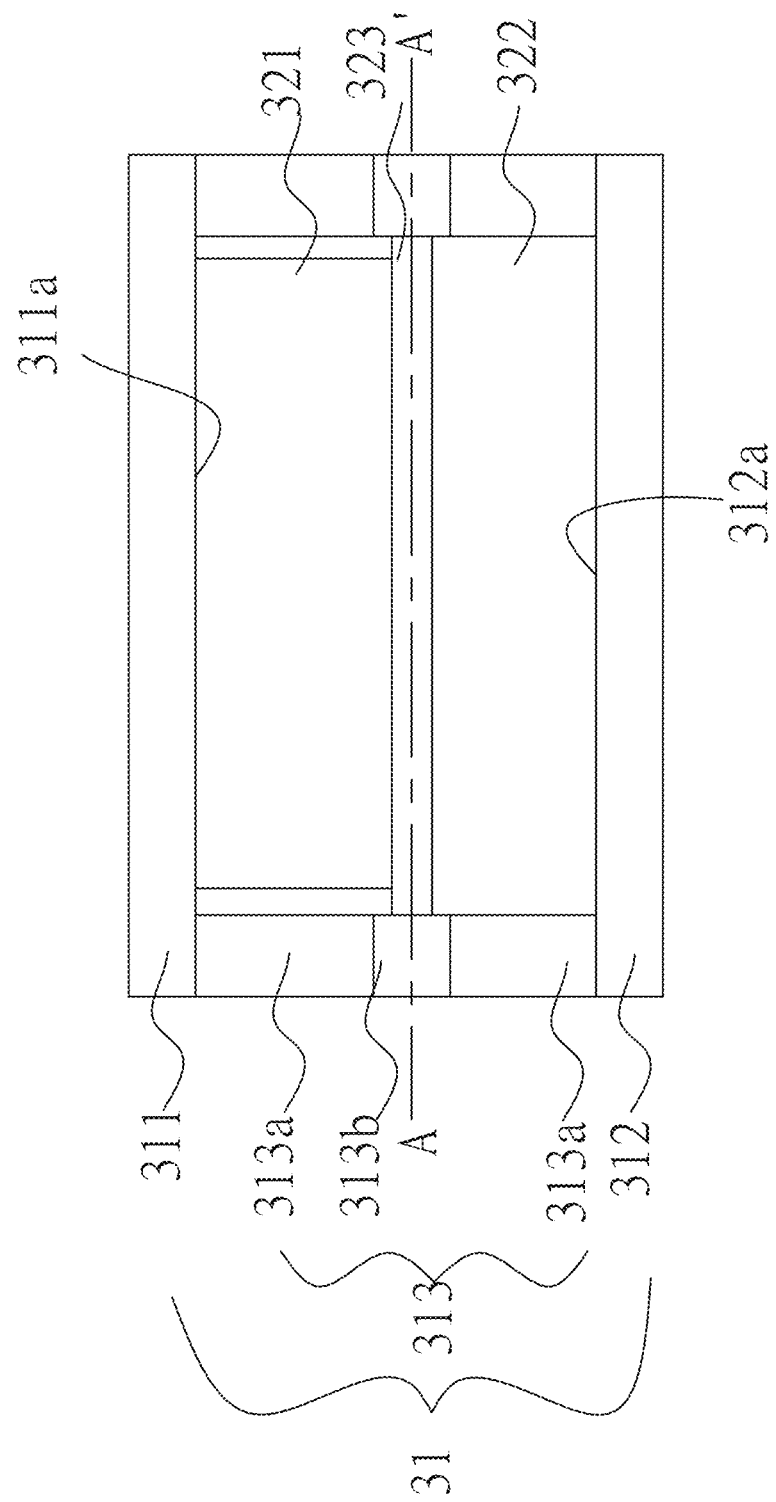
FIG. 8 illustrates the cross-section view configuration along the A-A' line in FIG. 2A.

The electricity supply unit 32 mentioned above includes at least two electrode layers 321 and 322 and at least one separator layer 323. The two electrode layers 321 and 322 are disposed to directly contact to the sealing frame 313 (as shown in FIG. 2B). In other embodiment, one of the two electrode layers 321,322 is disposed to directly contact to the sealing frame 313 (as shown in FIG. 8), usually an anode electrode layer. In FIG. 8, the electrode layer 321 which does not directly contact to the sealing frame 313 is usually a cathode electrode layer. Also, a part of the first conductive surface 311a is exposed between the sealing frame 313 and the electrode layer 321 because the electrode layer 321 does not directly contact to the sealing frame 313. The electricity supply unit 32 is a lithium-ion conductive function layer for a lithium cell.

The first silicone layers 313a are utilized to support the electricity supply unit 32 to get a balance stress relationship between the electrode layers 321, 322. Therefore, the thickness of the first silicone layers 313a is close to the thickness of the electrode layers 321, 322. Each of the first silicone layers 313a has a thickness ranging from 70 percent to 90 percent with respect to the sum of the thickness of the separator layer 323 and the first active material layer (the electrode layer 321) or with respect to the sum of the thickness of the separator layer 323 and the second active material layer (the electrode layer 322). Preferably, each of the first silicone layers 313a has a thickness ranging from 80 percent to 85 percent with respect to the sum of the thickness of the separator layer 323 and the first active material layer (the electrode layer 321) or with respect to the sum of the thickness of the separator layer 323 and the second active material layer (the electrode layer 322).

The second silicone layer 313b is served as a bonding layer in the invention and its thickness is a setting value, not varied depending on the first silicone layers 313a. The thickness of the second silicone layers 313b is 0.5 µm to 2.5 µm. When the thickness of the second silicone layers 313b is too thin, i.e. thinner than 0.5 µm, the adhesion will be too weak. When the thickness of the second silicone layers 313b is too thick, i.e. thicker than 2.5 µm, the water barrier effect would be too worse. Preferably, the thickness of the second silicone layers 313b is 1 µm to 2 µm.

Each separator layer 323 is located between the adjacent two electrode layers 321 and 322. One of the purposes of the separator layer 323 is to prevent the electrode layer 321 directly connected to the electrode layer 322. The electrode layers 321 and 322 and the separator layer 323 are all moistened by the electrolyte including the liquid-phase electrolyte, gel type electrolyte and solid-phase electrolyte. The materials of the separator layer 323 include the polymers, the ceramics or the glass fibers.

Figure 4A:
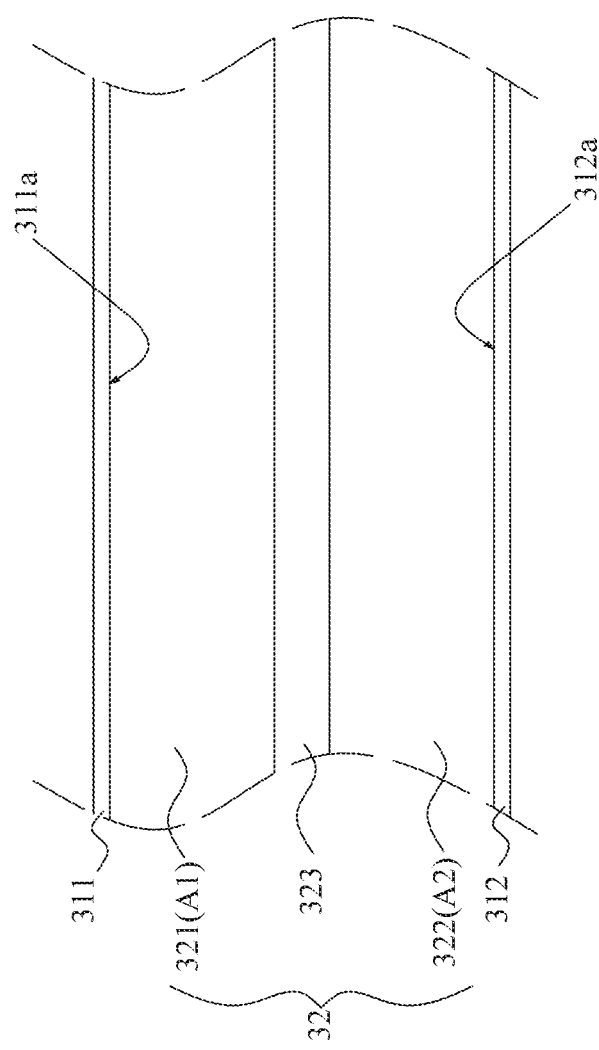
FIG. 4A illustrates an embodiment that the conductive surface of the substrate serves as a current collector layer of the present invention.
Figure 4B:
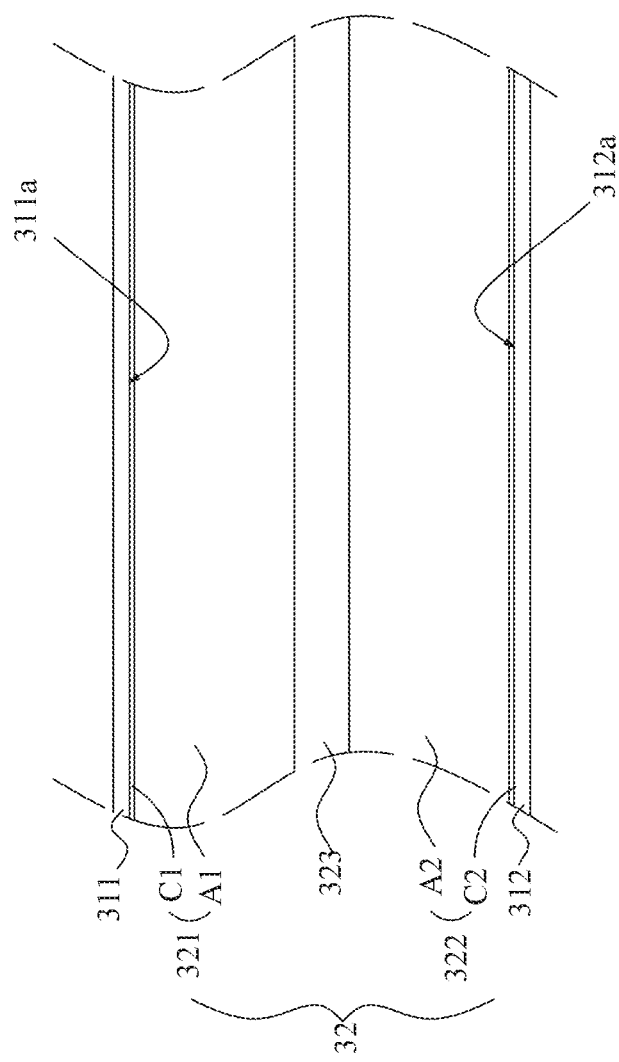
FIG. 4B illustrates an embodiment that the conductive surface of the substrate dose not serve as a current collector layer of the present invention.

The electrode layer 321 includes an active material layer A1 and the electrode layer 322 includes an active material layer A2. As illustrated in FIG. 4A, the first substrate 311 has the first conductive surface 311a, served as a first current collector, and the second substrate 312 has the second conductive surface 312a, served as a second current collector. The active material layer A1 is directly contacted to or formed on the first conductive surface 311a of the first substrate 311 and the active material layer A2 is directly contacted to or formed on the second conductive surface 312a of the second substrate 312. That is, there is no any other structure exists between the active material layer A1 and the first conductive surface 311a of the first substrate 311; there is no any other structure exists between the active material layer A2 and the second conductive surface 312a of the second substrate 312 either. The formation method for the active material layers A1 and A2 may include that the active material layers A1 and A2 are directly formed on the conductive surface 311a and 312a and that the active material layers A1 and A2 are against to the conductive surface 311a and 312a by the mechanical design such as vacuum sealing. No matter what kind of formation method is exerted, the electrical power generated by the active material layers A1 and A2 can be directly transferred to the conductive surface 311a and 312a of the first substrate 311 and 312 (both of the substrate 311 and 312 act as the circuit broad in this embodiment). In FIG. 4B, the current collector layers illustrated are independent components comparing to the current collector layers illustrated in FIG. 4A are one part of the substrates. The current collector layers C1 and C2 illustrated in FIG. 4B are independent components while the conductive surfaces 311a and 312a of the substrates 311 and 312 act as the current collector layers illustrated in FIG. 4B. In the embodiment shown in FIG. 4B, the definition of the electrode layer 321 includes the active material layer A1 and the current collector layer C1 and the active material layer A1 is formed on the current collector layer C1. The definition of the electrode layer 322 includes the active material layer A2 and the current collector layer C2 and the active material layer A2 is formed on the current collector layer C2. The electrical connection between the electricity supply unit 32 and the package structure 31 is implemented by the direct connection between the current collector layers C1 and C2 and the conductive surfaces 311a and 312a of the substrates 311 and 312 or by the indirect connection between the current collector layers C1 and C2 and the conductive surfaces 311a and 312a of the substrates 311 and 312. The indirect connection mentioned here can be implemented by exerting the extra conductive wires, tabs or any other conductive components such as the metal strip, thin metal sheet and so on to be the electrical connection between the between the current collector layers C1 and C2 and the conductive surfaces 311a and 312a of the substrates 311 and 312.

Accordingly, the package structure 31 of this invention is electrically connected to the electricity supply unit 32 and the electrical connection between the electricity supply unit 32 and the package structure 31 may be the direct electrical connection or the indirect electrical connection. Such design for the package structure 31 and the electricity supply unit 32 may not only greatly increase the contact area of the electrical connection but dramatically decrease the resistance of the electricity supply unit 32 as well. At the same time, as the electricity supply system 3 is damaged due to impacting, falling down or nail penetrating and so on, the active material layers A1 and A2 of the electrode layers 321 and 322 and/or the current collector layers C1 and C2 of the electrode layers 321 and 322 would be immediately separated from the electrode layers 321 and 322 for the occurrences of the partial high temperature or the broken structure. So, the electrical connection between the electricity supply unit 32 and the package structure 31 would be entirely destroyed, that is, the whole electricity supply system 3 would be under the open circuit state so that the chemical reactions inside the electricity supply unit 32 can be terminated to avoid the explosion or firing of the electricity supply system 3 due to the serious of the chain reactions occurring inside the electricity supply unit 32.

Figure 5A:
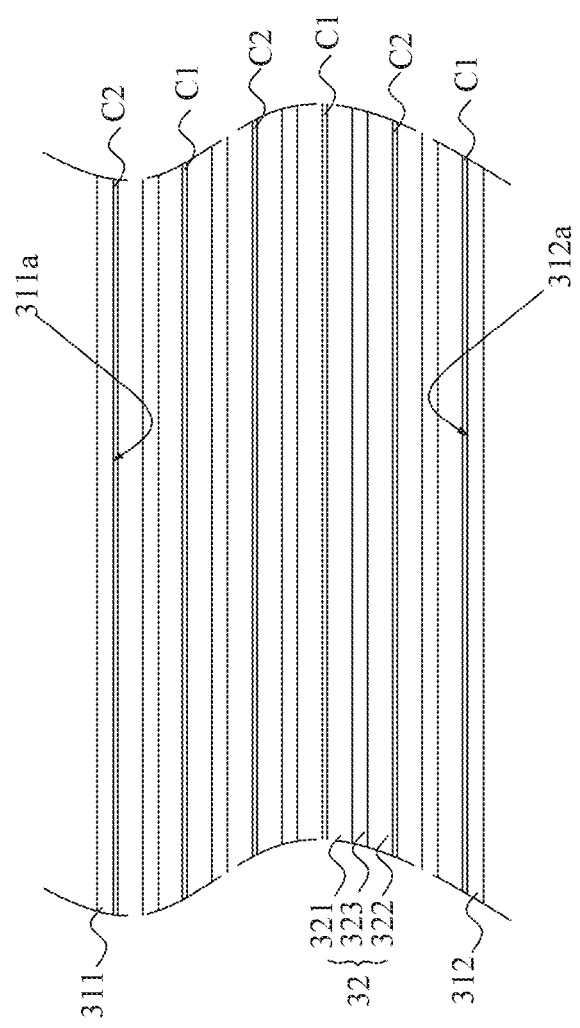
FIG. 5A illustrates the cross-section configuration of the electricity supply system having the multi-layer electrode placed inside the package structure of the present invention.

The configuration of the electricity supply unit 32 mentioned may be the stacking structure of one cathode electrode layer 321, one separator layer 323 and one anode electrode layer 322 or be the stacking structure of several cathode electrode layers 321, several separator layers 323 and several anode electrode layers 322 as shown in FIG. 5A. Also, the configuration of the electricity supply unit 32' can be the winding structure as shown in FIG. 5B. Of course, the configuration of the electricity supply unit 32 mentioned in this invention may be any kinds of structures without limitation because the major difference between this invention and the prior art is the electrical connection between the electricity supply unit 32 and the package structure 31 while there is no any electrical connection between the current electricity supply system and the current package structure.

Figure 6A:
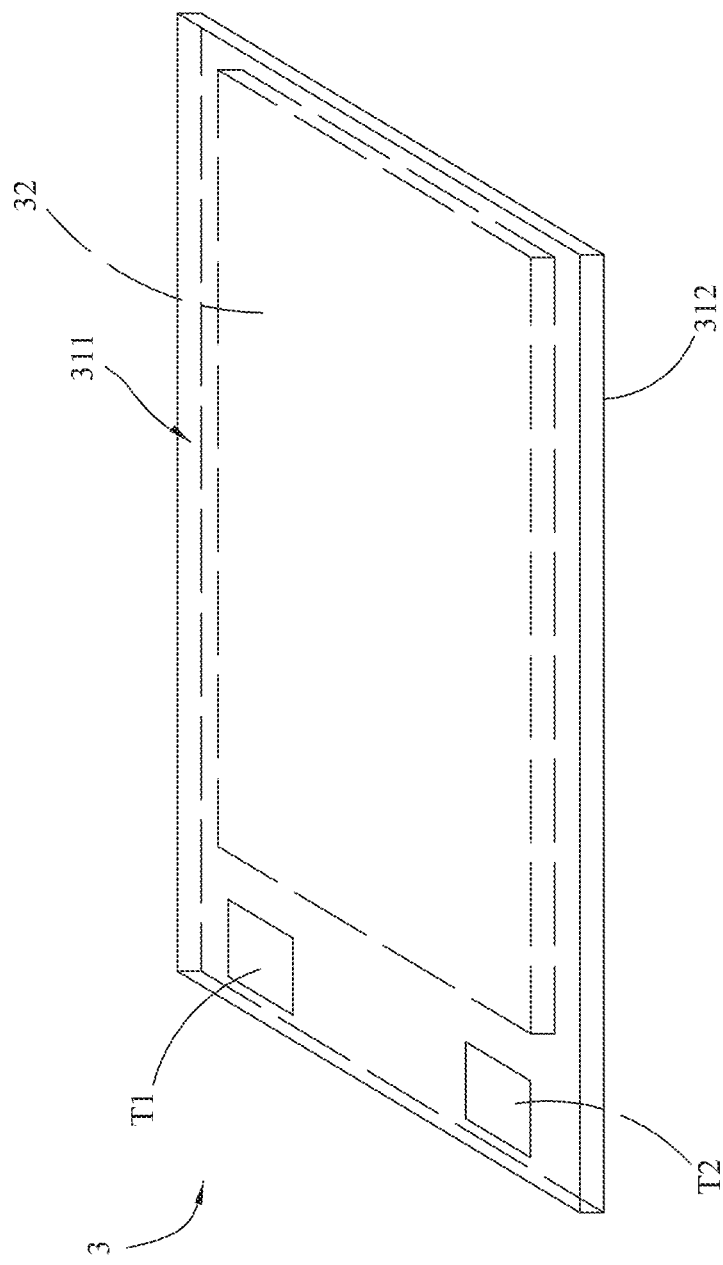
FIG. 6A illustrates an embodiment that two terminals of the electricity supply system are located on two different substrates of the present invention.
Figure 6B:
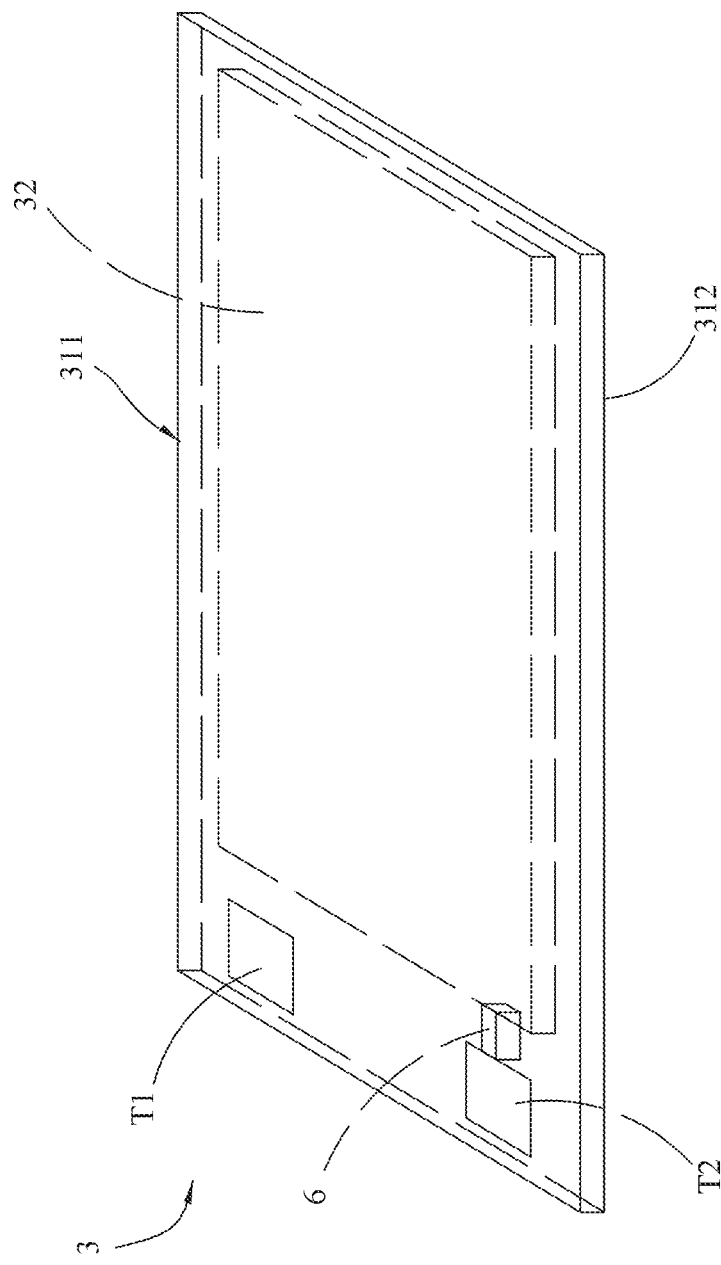
FIG. 6B illustrates an embodiment that two terminals of the electricity supply system are located on one substrate of the present invention.

The package structure 31 includes at least two terminals T1 and T2. One end of the terminal T1 is electrically connected to the cathode electrode layer 321 of the electricity supply unit 32 while another end of the terminal T1 is located on the first substrate 311 of the package structure 31 and acts as a connection point to connect to the peripherals (not shown). One end of the terminal T2 is electrically connected to the anode electrode layer 322 of the electricity supply unit 32 while the other end of the terminal T2 is located on the second substrate 312 of the package structure 31 and acts as a connection point to connect to the peripherals (not shown). The terminals T1 and T2 can be located on the same substrate 311 or 312 or located on the different substrate 311 or 312. As illustrated in FIG. 6A, the terminal T1 is located on the first substrate 311 and the terminal T2 is located on the second substrate 312. The electrode layer 321 is electrically connected to the terminal T1 due to the electrical connection between the conductive surface 311a of the substrate 311 and the electrode layer 321 of the electricity supply unit 32. The electrode layer 322 is electrically connected to the terminal T2 due to the electrical connection between the conductive surface 312a of the substrate 312 and the electrode layer 322 of the electricity supply unit 32. And the electrical connections between the terminal T1 and the electrode 321 and between the terminal T2 and the electrode 322 can be implemented by direct circuit layout or any conductive components. In FIG. 6B, the two terminals T1 and T2 are located on the same substrate 311 or 312 so that the electrode layers 321 and 322 are individually electrical connected to the terminals T1 and T2 due to the electrical connection between the conductive surfaces 311a and 312a of the substrates 311 and 312 and the electrode layers 321 and 322 of the electricity supply unit 32. In this way, by the conductive element 6 such as the conductive glue, the electrical power generated by the electrode layer 321 of the substrate 311 is able to be transferred from the terminal T1 on the conductive surface 311a of the substrate 311 to the terminal T2 on the conductive surface 312a of the substrate 312.

Figure 7:
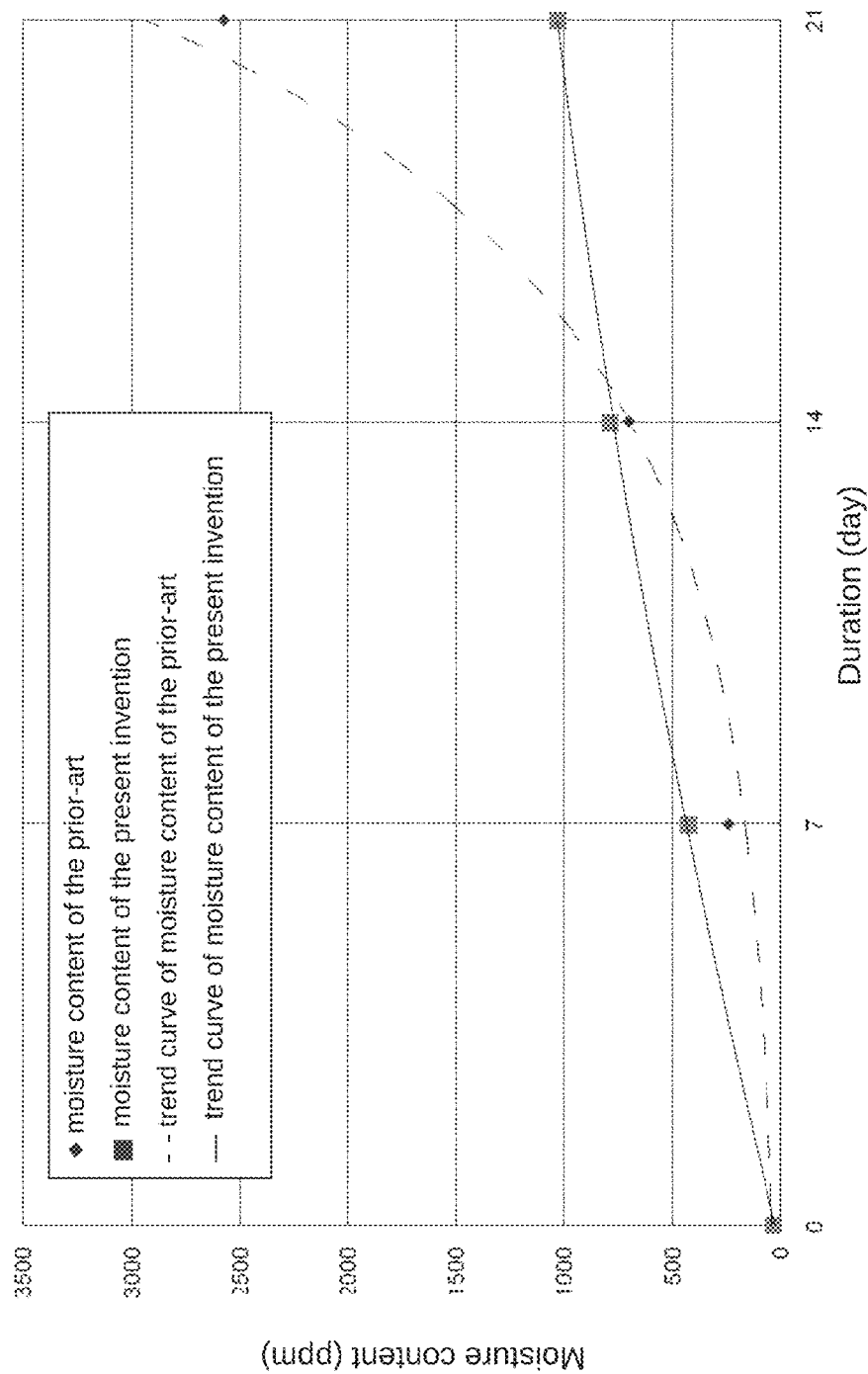
FIG. 7 illustrates the aging test result of both the prior-art and the present package structures under the aging test condition of the temperature at 60° C. and the moisture at 95% RH.

The package structure mentioned above mainly has four functions. The first function is to seal the electricity supply system completely inside the package structure. As is known to all, a great amount of the electrolyte must be impregnated by the electricity supply system to make the chemical-electrical reactions occurring inside the electricity supply system can be workable. Fortunately, the polarities of the sealing frame and the electrolyte are different from each other so that after forming the first silicone layers on to the two substrates and forming the second silicone layer on to at least one first silicone layer, the adhesion layers stained with the electrolyte still can be able to adhere to each other because the electrolyte staining on the adhesion layers would be repelled. In this way, the adhesion ability of the first silicone layer to the substrate and the adhesion ability of the first silicone layer to the second silicone layer would not be affected even the electricity supply system is soaked in a great amount of electrolyte. Besides, by the repellence of the electrolyte and the adhesion layers, most of the electrolyte would be kept inside the electricity supply system during pressing process. The second function is to reduce the possibility of the lithium metal formation. The main reason of this is because the material of the sealing frame is not metal but polymer. As the electrochemical reactions occurring around 0V, the lithium ions would be easy to form the lithium metal if the lithium ions contact with the metal material such as copper or nickel. The third function is to provide excellent flexibility even after thermal curing process. Because the material of the sealing frame is mainly silicone, the material is not the thermal plastic materials and this is why the sealing frame would be able to keep its flexibility even under the thermal treatments. The forth function is to increase the moisture resistant ability. Also, the sealing frame is a kind of the hydrophobic component. Since the sealing frame is hydrophobic, the moisture inside the sealing frame can only be transferred by diffusing. Until the moisture entirely diffuses into sealing frame, that is, the moisture concentration of the sealing frame has been reached to saturation, and then the moisture would be able to penetrate into the electricity supply system inside the package structure gradually. Hence, the sealing frame is helpful for slowing down the speed of moisture penetration. As illustrated in FIG. 7, comparing to the prior art, under the aging test conditions of the temperature at 60° C. and the moisture at 95% RH, the package structure of this invention gets higher moisture content at the first 7-day test but indeed gets much lower moisture content at the 14-day test and at the 21-day test as well. According to this aging test, the first 7-day result can be taken as one-year usage of the package structure under normal condition (the package structure is operated under the room temperature and moisture for one year) while the 14-day result and the 21-day result reveal the two-year usage condition and the three-year usage condition individually. Obviously, the package structure shows better ability of moisture resistance for long-time usage.

Since the two substrates of the package structure are directly or indirectly served as current collectors of the electricity supply system, the electricity supply system can be directly integrated with the circuit broad and also can be processed by the normal PCB or SMT processes. For example, the electricity supply system can be taken as an element of SMT so that the SMT processes are able to be exerted for manufacturing the electricity supply system and of course, the process cost can be reduced. Besides, because the surfaces of the substrates can be used for laying some peripheral electronic elements or electrical circuits, the dimensions of the electronics can be much smaller and thinner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electricity supply system, comprising:
   a first electrode, having a first active material layer and a first current collector directly contacted to the first active material layer and having a first sealing region;
   a second electrode, having a second active material layer and a second current collector directly contacted to the second active material layer and having a second sealing region;
   a separator layer, located between the first electrode and the second electrode layer; and
   a flexible sealing frame, disposed between the first sealing region of the first current collector and the second sealing region of the second current collector, wherein the flexible sealing frame adheres the first current collector to the second current collector for providing an enclosed space to accumulate the first active material, the second active material and the separator layer, the flexible sealing frame comprising:
      two first silicone layers, one of the first silicone layers adhering to the first sealing region of the first current collector, and the other one of the first silicone layers adhering to the second sealing region of the second current collector, wherein each of the first silicone layers mainly contains a chemical formula I of:

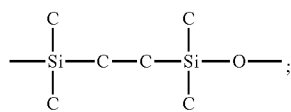

and
      a second silicone layer, located between the two first silicone layers to adhere therebetween, wherein the second silicone layer mainly contains a chemical formula II of:

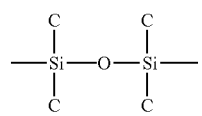

wherein both the first silicone layers and the second silicone layer contain the chemical formula I and the chemical formula II;
   wherein each of the first silicone layers has a thickness ranging from 70 percent to 90 percent with respect to the sum of the thickness of the separator layer and the first active material layer or with respect to the sum of the thickness of the separator layer and the second active material layer.

2. The electricity supply system of claim 1, wherein the first sealing region of the first current collector is defined along the circumference of the first current collector and the second sealing region of the second current collector is defined along the circumference of the second current collector.

3. The electricity supply system of claim 1, wherein at least one of the first current collector and the second current collector is a metal layer of a printed circuit board.

4. The electricity supply system of claim 1, wherein the first active material layer is directly contacted to the flexible sealing frame and the second active material layer does not contact to the flexible sealing frame.

5. The electricity supply system of claim 4, wherein the first active material layer is an anode active material layer and the second active material layer is a cathode active material layer.

6. The electricity supply system of claim 4, wherein the second current collector is exposed between the flexible sealing frame and the second active material layer.

7. The electricity supply system of claim 1, wherein the first silicone layers are modified by increasing a proportion of addition-type silicone.

8. The electricity supply system of claim 1, wherein the first silicone layers are modified by adding epoxy, acrylic acid or a combination thereof into silicone.

9. The electricity supply system of claim 1, wherein the second silicone layer further comprises a spacer, wherein the spacer includes silicon dioxide particles, titanium oxide particles or a combination thereof.

10. The electricity supply system of claim 1, wherein amounts of the chemical formula II within the second silicone layer is greater than amounts of the chemical formula II within each of the first silicone layers by 0.1% to 60%, on a weight/volume basis.

11. The electricity supply system of claim 1, wherein a thickness of the second silicone layer is 0.5 μm to 2.5 μm.

12. The electricity supply system of claim 11, wherein a thickness of the second silicone layer is 1 μm to 2 μm.

13. The electricity supply system of claim 1, wherein each of the first silicone layers has a thickness ranging from 75 percent to 80 percent with respect to the sum of the thickness of the separator layer and the first active material layer or with respect to the sum of the thickness of the separator layer and the second active material layer.

14. The electricity supply system of claim 1, wherein the second silicone layer has a moisture-blocking crystalline structure.

15. The electricity supply system of claim 1, wherein a thickness of the second silicone layer is a setting value and the setting value is not varied depending on a thickness of the first silicone layer.

* * * * *